(12) United States Patent
Farooq et al.

(10) Patent No.: US 8,490,735 B2
(45) Date of Patent: Jul. 23, 2013

(54) VEHICLE HOOD STRUCTURE FOR PEDESTRIAN BODY IMPACT PROTECTION

(75) Inventors: Iskander Farooq, Novi, MI (US); Srinivasan Sundararajan, Ann Arbor, MI (US); Edgar Edward Donabedian, Livonia, MI (US); Greg B Zinn, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 113 days.

(21) Appl. No.: 13/171,180

(22) Filed: Jun. 28, 2011

(65) Prior Publication Data

US 2013/0001004 A1    Jan. 3, 2013

(51) Int. Cl.
*B60R 21/38* (2011.01)
*B62D 25/10* (2006.01)

(52) U.S. Cl.
USPC ............... 180/274; 180/69.21; 296/187.04; 296/193.11

(58) Field of Classification Search
USPC .......... 180/69.21, 274, 281, 289; 296/187.04, 296/193.11
See application file for complete search history.

(56) References Cited

U.S. PATENT DOCUMENTS

| | | | | |
|---|---|---|---|---|
| 5,263,546 A * | 11/1993 | Cady et al. | ............... | 180/69.21 |
| 5,697,467 A * | 12/1997 | Howard | ............... | 180/69.21 |
| 6,257,657 B1 * | 7/2001 | Sasaki | ............... | 296/187.09 |
| 6,293,362 B1 * | 9/2001 | Sasaki et al. | ............... | 180/274 |
| 6,330,734 B1 * | 12/2001 | Cho | ............... | 16/376 |
| 6,345,679 B1 | 2/2002 | Sasaki | | |
| 6,364,402 B1 * | 4/2002 | Sasaki | ............... | 296/187.09 |
| 6,415,882 B1 * | 7/2002 | Schuster et al. | ............ | 180/69.21 |
| 6,439,330 B1 * | 8/2002 | Paye | ............... | 180/69.21 |
| 6,513,617 B2 * | 2/2003 | Sasaki et al. | ............... | 180/274 |
| 6,520,276 B2 * | 2/2003 | Sasaki et al. | ............... | 180/274 |
| 6,554,093 B2 * | 4/2003 | Sasaki et al. | ............... | 180/274 |
| 6,571,901 B2 * | 6/2003 | Lee | ............... | 180/274 |
| 6,588,526 B1 * | 7/2003 | Polz et al. | ............... | 180/69.21 |
| 6,668,962 B2 * | 12/2003 | Son | ............... | 180/274 |
| 6,942,056 B2 * | 9/2005 | Nadeau et al. | ............... | 180/274 |
| 6,953,220 B2 * | 10/2005 | Takehara | ............... | 296/187.04 |
| 7,073,846 B2 * | 7/2006 | Borg et al. | ............... | 296/187.13 |
| 7,303,040 B2 * | 12/2007 | Green et al. | ............... | 180/274 |
| 7,410,027 B2 * | 8/2008 | Howard | ............... | 180/274 |
| 7,413,049 B2 * | 8/2008 | Schramm et al. | ............ | 180/274 |
| 7,520,363 B2 * | 4/2009 | Yamaguchi et al. | .......... | 180/274 |

(Continued)

FOREIGN PATENT DOCUMENTS

DE    102009001273    *  9/2010
GB       2354797 A    *  4/2001

(Continued)

*Primary Examiner* — Paul N Dickson
*Assistant Examiner* — Laura Freedman
(74) *Attorney, Agent, or Firm* — Angela M. Brunetti; Frank MacKenzie (57) ABSTRACT

Embodiments of the present invention relate to pedestrian head impact protection. In operation, during a pedestrian impact event with a vehicle, a pedestrian protection deployable hood apparatus configured in accordance with an embodiment of the present invention causes displacement of the hood at its hinge-carrying portion for enhancing clearance an underside of the hood and a topmost surface of under-hood components. Such embodiments of the present invention contribute to providing for pedestrian head impact protection in a manner that can be implemented with a variety of hood mounting arrangements, that is effective in its results, and that is simple to package in an under-hood environment.

17 Claims, 4 Drawing Sheets

U.S. PATENT DOCUMENTS

| | | | |
|---|---|---|---|
| 7,559,399 B2 * | 7/2009 | Lewis et al. | 180/274 |
| 7,594,555 B2 * | 9/2009 | Lutter et al. | 180/69.21 |
| 7,637,344 B2 * | 12/2009 | Park | 180/274 |
| 7,690,465 B2 * | 4/2010 | Hirata | 180/69.21 |
| 7,712,569 B2 * | 5/2010 | Scheuch et al. | 180/274 |
| 7,730,990 B2 * | 6/2010 | Boggess et al. | 180/274 |
| 7,815,007 B2 * | 10/2010 | Mori et al. | 180/274 |
| 7,934,293 B2 * | 5/2011 | Kalargeros | 16/369 |
| 7,954,588 B2 * | 6/2011 | Inomata et al. | 180/274 |
| 8,398,125 B2 * | 3/2013 | Takahashi et al. | 292/45 |
| 2009/0283347 A1 | 11/2009 | Boggess | |
| 2010/0244484 A1 | 9/2010 | Nakaura | |

FOREIGN PATENT DOCUMENTS

| | | | |
|---|---|---|---|
| GB | 2372536 A | * | 8/2002 |
| GB | 2382549 A | * | 6/2003 |
| GB | 2386875 A | * | 10/2003 |
| GB | 2394922 A | * | 5/2004 |
| GB | 2452252 A | * | 3/2009 |
| JP | 04081369 A | * | 3/1992 |
| WO | 2004094204 A1 | | 11/2004 |

* cited by examiner

VEHICLE HOOD STRUCTURE FOR PEDESTRIAN BODY IMPACT PROTECTION

FIELD OF THE DISCLOSURE

The disclosures made herein relate generally to vehicle safety features and, more particularly, to a vehicle hood structure configured for providing pedestrian body impact protection.

BACKGROUND

During a pedestrian impact event with a vehicle, it is well known that forces exerted on the pedestrian's body from a front portion of the vehicle (e.g., the bumper and/or grill) will often result in the pedestrian's body being moved in a manner that causes the pedestrian's head to impinge upon the hood of the vehicle. In certain vehicle designs, the clearance between the underside of the hood and the topmost surface of under-hood components of the vehicle offers limited downward deflection of the hood before the hood engages the topmost surface of such under-hood components. The portion of the hood engaged with the topmost surface of such under-hood components becomes, in effect, a non-compliant and/or non-deflecting (i.e., effectively solid) surface. As a result, during impingement of the pedestrian's head on the hood, engagement of the hood with the topmost surface of such under-hood components can contribute to serious head trauma as compared to if the hood was allowed to deflect in a more unrestricted manner.

In accordance with certain vehicle test protocols as related to pedestrian head impact protection, there needs to be a gap of more than about 75 mm between the underside of the hood of a vehicle and the topmost surface of its under-hood components. Existing design solutions to address pedestrian head impact protection include structures such as, for example, complicated multi-bar link hinges, difficult to package under hood/cowl airbags, spring assist hood lift mechanisms, hood attachment pin(s) that shear off before pedestrian head impact, and other complex and/or costly solutions. Invariably, cost of the system increases with complexity. Thus, there is a need for a cost-effective solution to pedestrian head impact protection that can be implemented with a variety of hood mounting arrangements, that is effective in its results, and that is simple to package in an under-hood environment.

SUMMARY OF THE DISCLOSURE

Embodiments of the present invention relate to pedestrian head impact protection. In operation, during a pedestrian impact event with a vehicle, a pedestrian protection deployable hood apparatus configured in accordance with an embodiment of the present invention causes displacement of the hood at its hinge-carrying portions for enhancing clearance at an underside of the hood and a topmost surface of under-hood components. Furthermore, such embodiments of the present invention contribute to providing for pedestrian head impact protection in a manner that can be implemented with a variety of hood mounting arrangements, that is effective in its results, and that is simple to package in an under-hood environment. As such, embodiments of the present invention contribute to providing pedestrian head impact protection in manner that overcomes shortcomings and/or drawbacks of prior art approaches for providing pedestrian head impact protection.

In one embodiment of the present invention, a hinge assembly is configured for pivotably attaching a hood of a vehicle to a body structure of the vehicle. The hood and the body structure define mounting interfaces through which the hinge assembly is connected between the hood and the body structure. The hinge assembly comprises a first hinge member, a second hinge member, and a third hinge member. The first hinge member has a first end portion thereof configured for being attached to the vehicle at a first one of the mounting interfaces. The second hinge member has a first end portion thereof configured for being attached to the vehicle at a second one of the mounting interfaces. The third hinge member has a first end portion thereof pivotably attached to a second end portion of the first hinge member for allowing pivoting therebetween about a first pivot axis and has a second end portion thereof pivotably attached to a second end portion of the second hinge member for allowing pivoting therebetween about a second pivot axis. A separable joint is provided between the second and third hinge members. The separable joint couples the second hinge member to the third hinge member to inhibit pivotal movement therebetween about the second pivot axis. Sufficient force being exerted on at least one of the hinge members causes the second hinge member to become decoupled from the third hinge member at the separable joint thereby allowing pivoting between the second and third hinge members about the second pivot axis.

In another embodiment of the present invention, a vehicle comprises a hinge assembly and a force exerting device. The hinge assembly pivotably attaches a hood of the vehicle to a body structure of the vehicle for allowing the hood to be moved between a closed orientation and an open orientation (i.e., conventional opening and closing action of a vehicle's hood). The hood and the body structure define mounting interfaces through which the hinge assembly is connected between the hood and the body structure. The hinge assembly includes a first hinge member, a second hinge member, and a third hinge member. The first hinge member has a first end portion thereof attached to a first one of the mounting interfaces. The second hinge member has a first end portion thereof attached to a second one of the mounting interfaces. The third hinge member has a first end portion thereof pivotably attached to a second end portion of the first hinge member for allowing pivoting therebetween about a first pivot axis and has a second end portion thereof pivotably attached to a second end portion of the second hinge member for allowing pivoting therebetween about a second pivot axis. A separable joint is provided between the second and third hinge members for coupling the second hinge member to the third hinge member to inhibit pivotal movement therebetween about the second pivot axis until sufficient force is exerted on at least one of the hinge members for causing the second hinge member to become decoupled from the third hinge member at the separable joint thereby allowing pivoting between the second and third hinge members about the second pivot axis. The force exerting device includes a force delivering member selectively moveable from an at-rest position toward a fully displaced position. The force exerting device is mounted on the body structure adjacent to the hinge assembly such that the force delivering member comes into contact with one of the second and third hinge members as the force delivering member moves from its at-rest position toward its fully displaced position when the hood is in the closed orientation. The force exerting device causes the force delivering member to move from its at-rest position toward its fully displaced position with sufficient force for the second hinge member to become detached from the third hinge member at the separable joint.

In another embodiment of the present invention, a method provides for pedestrian head impact protection at a hood of a vehicle using a hood hinge assembly having a deforming hinge member. The method comprises sensing an impact at a frontal portion of a vehicle and causing the deforming hinge member of the hood hinge assembly to become deformed in response to sensing the impact. The hood hinge assembly is deformed such that a relative position of the hood with respect to a body structure of the vehicle is altered in a manner whereby a distance between an underside of the hood and a topmost surface of an under-hood component of the vehicle is increased by the altered relative position of the hood with respect to the body structure. Causing the deforming hinge member to become deformed can include energizing a force exerting device mounted on the body structure such that a force delivering member of the force exerting device moves from an at-rest position thereof toward a fully displaced position thereof thereby forcibly engaging the hinge assembly as the force delivering member moves from the at-rest position thereof toward the displaced position thereof.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
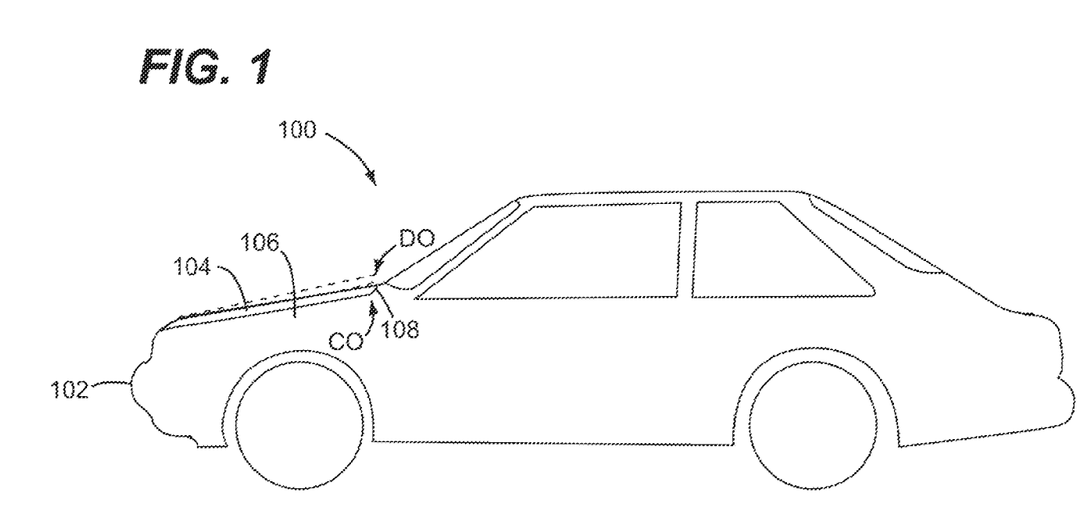
FIG. 1 is an illustrative view of a vehicle configured for providing pedestrian head impact protection in accordance with an embodiment of the present invention.

As shown in FIG. 1, a vehicle 100 configured in accordance with an embodiment of the present invention provides pedestrian head impact protection. In operation, during a pedestrian impact event with the vehicle 100, an impact at a frontal portion 102 of the vehicle 100 is sensed such as, for example, by an airbag deployment frontal impact sensor, a pedestrian impact specific sensor and/or the like. A hood 104 of the vehicle 100 is mounted on a body structure 106 of the vehicle through one or more hinge assemblies (not specifically shown in FIG. 1), which are located at a rear portion 108 of the hood 104. Typically, a hood of a vehicle is mounted using two spaced apart hinge assemblies. Examples of the body structure 106 include, but are not limited to, a chassis structure, a uni-body structure, an inner body panel, a firewall, and/or other structural component of the vehicle 100. In response to sensing the impact, the hood hinge assembly has exerted thereon a device-applied force for causing a portion of the hinge assembly (e.g., a deforming hinge member) to become deformed such that a relative position of the hood 104 with respect to the body structure 106 of the vehicle 100 is altered. More specifically, the relative position of the hood 104 with respect to the body structure 106 is altered in a manner whereby a distance between an underside of the hood 104 and a topmost surface of an under-hood component of the vehicle 100 (e.g., an engine intake, strut tower brace, firewall cowl, etc) is increased by such altered relative position of the hood 104 with respect to the body structure 106. As shown, prior to the portion of the hinge assembly becoming deformed (i.e., prior to the impact and resulting implementation of the pedestrian head impact protection), the hood 104 is in a normal closed orientation CO with respect to the body structure 106. After implementation of the pedestrian head impact protection (i.e., sensing of the impact and resulting device applied force), the hood 104 is in a displaced orientation DO with respect to the body structure 106. Preferably, when the hood 104 is in the displaced orientation DO, there is a gap of at least about 75 mm between the underside of the hood 104 and the topmost surface of the vehicle 100.

Referring now to FIGS. 2-5, a hinge assembly 200 configured in accordance with a first embodiment of the present invention is shown. The hinge assembly 200 and a force exerting device 202 jointly define a pedestrian head impact protection apparatus in accordance with the present invention. The hinge assembly 200 is an example of the hinge assembly used in providing the pedestrian head impact protection in the vehicle 100 of FIG. 1. Accordingly, the hinge assembly 300 will be described in relation to the vehicle 100 of FIG. 1.

The hinge assembly 200 pivotably attaches the hood 104 of the vehicle 100 to the body structure 106 of the vehicle 100 for allowing the hood 104 to be moved between the normal closed orientation CO with respect to the body structure 106 and the open orientation OO with respect to the body structure 106. As such, the hood 104 and the body structure 106 each define a respective mounting interface through which the hinge assembly 200 is connected between the hood 104 and the body structure 106. The hinge assembly 200 includes a first hinge member 204, a second hinge member 206, and a third hinge member 208. A first end portion 210 of the first hinge member 204 is attached to the hood 104 (i.e., a first mounting interface) by threaded fasteners 212. A first end portion 214 of the second hinge member 206 is attached to the body structure 106 (i.e., a second mounting interface) by threaded fasteners 216. A first end portion 218 of the third hinge member 208 is pivotably attached to a second end portion 220 of the first hinge member 204 for allowing pivoting therebetween about a first pivot axis PA11, thereby allowing the hood 104 to move between the normal closed orientation CO with respect to the body structure 106 and the open orientation OO with respect to the body structure 106. A second end portion 222 of the third hinge member 208 is pivotably attached to a second end portion 224 of the second hinge member 206 for allowing pivoting therebetween about a second pivot axis PA21.

Figure 4:
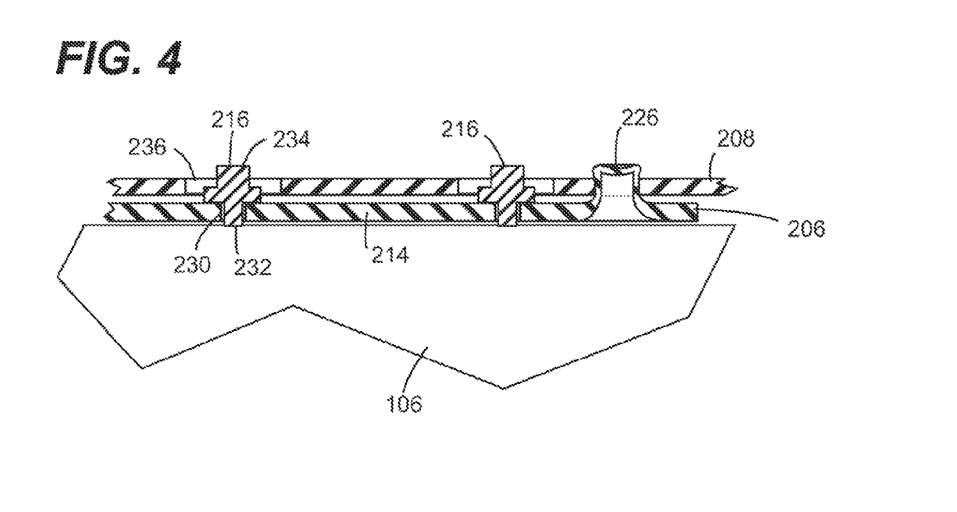
FIG. 4 is a fragmentary side cross-sectional view of the first embodiment of the pedestrian head impact protection apparatus of FIG. 2 showing configurations of mounting apertures, clearance apertures, and a separable joint thereof.

A separable joint 226 is provided between the second and third hinge members 206, 208. The separable joint 226 couples the second hinge member 206 to the third hinge member 208 to inhibit pivotal movement therebetween about the second pivot axis PA21 until sufficient force is exerted on the third hinge member 208 for causing the third hinge member 208 to become decoupled from the second hinge member 206 at the separable joint 226. After becoming decoupled, pivoting is allowed between the second and third hinge members 206, 208 about the second pivot axis PA21. As shown in FIG. 4, the separable joint 226 can include an aperture in the third hinge member 208 with a deformed protrusion of the second hinge member 206 engaged within the aperture. However, aside from being able to provide the abovementioned functionality of inhibiting pivotal movement between the second and third hinge members 206, 208 about the second pivot axis PA21 until sufficient force is exerted on the third hinge member 208, the separable joint 226 is not unnecessarily limited to being any particular type or configuration of structure.

Figure 5:
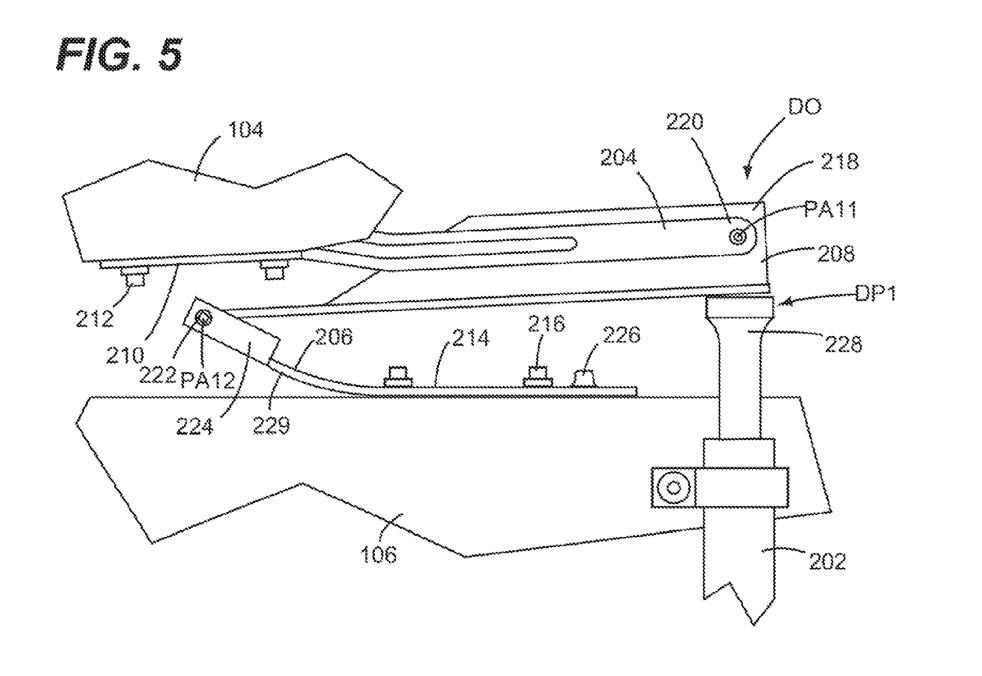
FIG. 5 is a fragmentary side view of the first embodiment of the pedestrian head impact protection apparatus of FIG. 2 with the hood in a displaced orientation as provided by such pedestrian head impact protection apparatus.

The force exerting device 202 includes a force delivering member 228 that is selectively moveable from an at-rest position RP1 toward a fully displaced position DP 1. The force exerting device 202 is mounted on the body structure 106 adjacent to the hinge assembly 200 such that the force delivering member 228 comes into contact with the first end portion 218 of the third hinge member 208 as the force delivering member 228 moves from its at-rest position RP 1 toward its fully displaced position DP1 when the hood 104 is in the closed orientation CO. As shown in FIG. 5, the force exerting device 202 causes the force delivering member 228 to move from its at-rest position RP1 toward its fully displaced position DP1 with sufficient force for the third hinge member 208 to become detached from the second hinge member 206 at the separable joint 226 and to deform the second hinge member 206 at an intermediate portion 229 for allowing the hood 104 to move to its displaced orientation DO with respect to the body structure 106.

Figure 2:
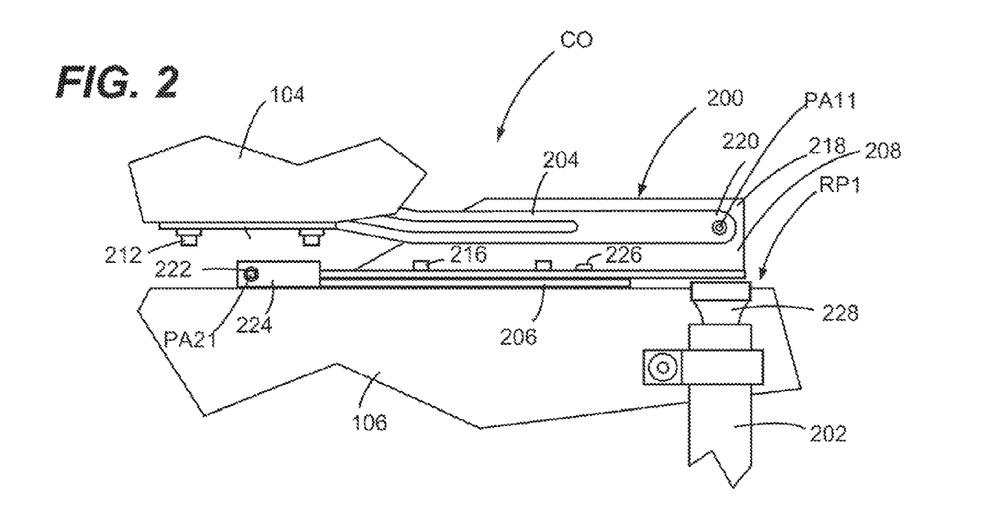
FIG. 2 is a fragmentary side view of a first embodiment of a pedestrian head impact protection apparatus configured in accordance with the present invention, wherein a hinge assembly of the pedestrian head impact protection apparatus is in a hood closed configuration.
Figure 3:
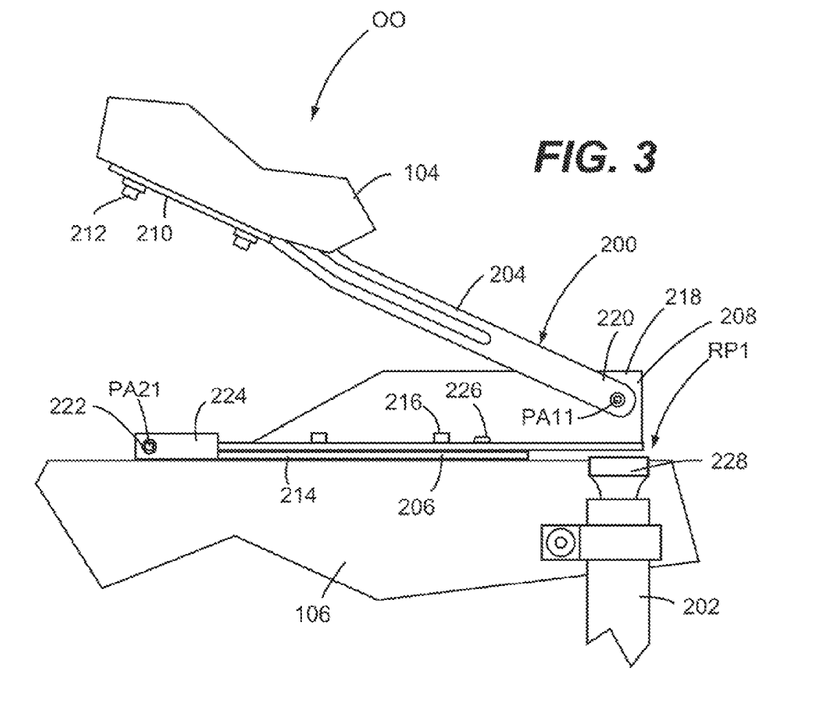
FIG. 3 is a fragmentary side view of the first embodiment of the pedestrian head impact protection apparatus of FIG. 2 with the hinge assembly in a hood open configuration.

The force exerting device 202 is not unnecessarily limited to being any particular type or configuration of force exerting device. Functionally, the force exerting device 202 needs to be configured for moving the force delivering member 228 from the at-rest position RP1 toward its fully displaced position DP 1 with sufficient force to break the separable joint 226 and to displace the hood 104 vertically to bend the second hinge member 206 (i.e., the deforming hinge member). Examples of means for displacing a force delivering member of a force exerting device include, but are not limited to, an explosive charge (i.e., pyrotechnic charge), a compressed spring, an electromagnetic field, a pneumatic charge, a hydraulic charge, and the like. It is disclosed herein that the second hinge member 206 can be configured for it to preferentially bend as opposed to the third hinge member 208 such as by, for example, material thickness (e.g., second hinge member material thinner than the third hinge member material), formed-in stiffening (e.g., third hinge member material including strengthening contours), and/or material strength (e.g., third hinge member material stronger than the second hinge member material).

As shown in FIG. 4, the second hinge member 206 has apertures 230 therein for allowing the second hinge member 206 to be secured to the body structure 106 by one of the fasteners 216 extending through each aperture 230. A configuration of each aperture 230 of the second hinge member 206 allows a shank portion 232 of the fastener 216 to pass therethrough and inhibits a head 234 of the fastener 216 from passing therethrough. As can also be seen in FIG. 4, the third hinge member 208 has an aperture 236 aligned with each aperture 230 of the second hinge member 206 when the second and third hinge members 206, 208 are coupled to each other by the separable joint 226. A configuration of the apertures 236 of the third hinge member 208 allows both the shank 232 and the head 234 of the fasteners 216 to pass therethrough. In this manner, the fasteners 216 do not inhibit or obstruct pivoting movement between the second and third hinge members 206, 208.

Referring now to FIGS. 6-9, a hinge assembly 300 configured in accordance with a second embodiment of the present invention is shown. The hinge assembly 300 and a force exerting device 302 jointly define a pedestrian head impact protection apparatus in accordance with the present invention. The hinge assembly 300 is an example of the hinge assembly used in providing the pedestrian head impact protection in the vehicle 100 in FIG. 1. Accordingly, the hinge assembly 300 will be described in relation to the vehicle 100 of FIG. 1.

Figure 6:
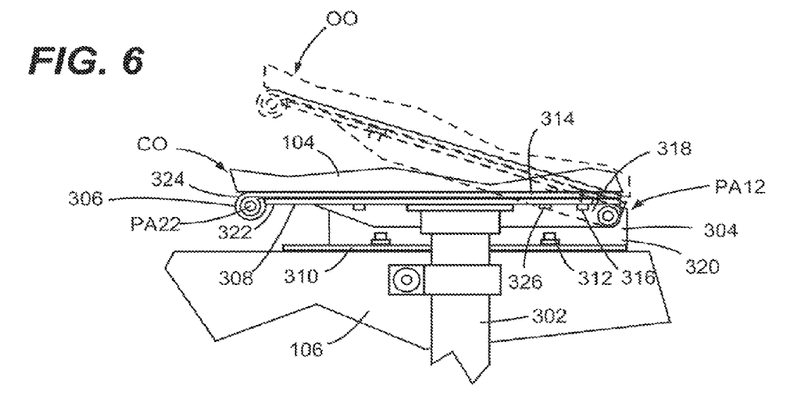
FIG. 6 is a fragmentary side view of a second embodiment of a pedestrian head impact protection apparatus configured in accordance with the present invention, wherein a hinge assembly of the pedestrian head impact protection apparatus is shown in a hood open configuration and a hood closed configuration.
Figure 7:
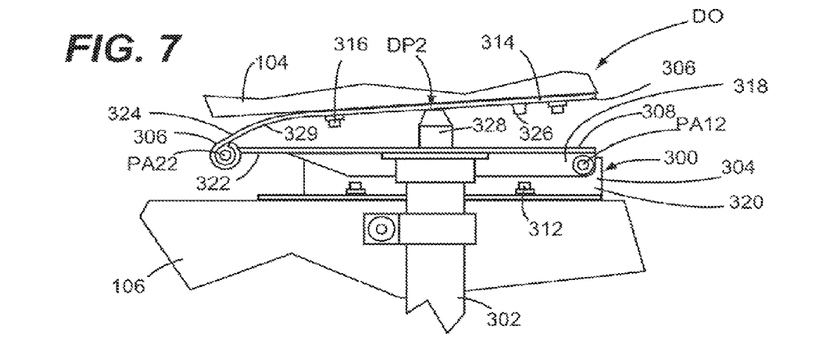
FIG. 7 is a fragmentary side view of the second embodiment of the pedestrian head impact protection apparatus of FIG. 6 with the hood in a displaced orientation as provided by such pedestrian head impact protection apparatus.

The hinge assembly 300 pivotably attaches the hood 104 of the vehicle 100 to the body structure 106 of the vehicle 100 for allowing the hood 104 to be moved between the normal closed orientation CO with respect to the body structure 106 and the open orientation OO with respect to the body structure 106. As such, the hood 104 and the body structure 106 each define a respective mounting interface through which the hinge assembly 300 is connected between the hood 104 and the body structure 106. The hinge assembly 300 includes a first hinge member 304, a second hinge member 306, and a third hinge member 308. A first end portion 310 of the first hinge member 304 is attached to the body structure 106 (i.e., a first mounting interface) by threaded fasteners 312. A first end portion 314 of the second hinge member 306 is attached to the hood 104 (i.e., a second mounting interface) by threaded fasteners 316. A first end portion 318 of the third hinge member 308 is pivotably attached to a second end portion 320 of the first hinge member 304 for allowing pivoting therebetween about a first pivot axis PA 12, thereby allowing the hood 104 to move between the normal closed orientation CO with respect to the body structure 106 and the open orientation OO with respect to the body structure 106. A second end portion 322 of the third hinge member 308 is pivotably attached to a second end portion 324 of the second hinge member 306 for allowing pivoting therebetween about a second pivot axis PA22.

A separable joint 326 is provided between the second and third hinge members 306, 308. The separable joint 326 couples the second hinge member 306 to the third hinge member 308 to inhibit pivotal movement therebetween about the second pivot axis PA22 until sufficient force is exerted on the second hinge member 306 for causing the second hinge member 306 to become decoupled from the third hinge member 308 at the separable joint 326. After becoming decoupled, pivoting is allowed between the second and third hinge members 306, 308 about the second pivot axis PA22. As discussed above in reference to FIG. 4, a separable joint configured in accordance with the present invention (e.g., the separable joint 326) can include an aperture in the third hinge member with a deformed protrusion of the second hinge member engaged within the aperture. As also discussed above in reference to FIG. 4, a separable joint configured in accordance with the present invention (e.g., the separable joint 326) is not unnecessarily limited to being any particular type or configuration of structure.

The force exerting device 302 includes a force delivering member 328 that is selectively moveable from an at-rest position RP2 toward a fully displaced position DP2. The force exerting device 302 is mounted on the body structure 106 adjacent to the hinge assembly 300 such that the force delivering member 328 comes into contact with the first end portion 314 of the second hinge member 306 as the force delivering member 328 moves from its at-rest position RP2 toward its fully displaced position DP2 when the hood 104 is in the closed orientation CO. As shown in FIG. 7, the force exerting device 302 causes the force delivering member 328 to move from its at-rest position RP2 toward its fully displaced position DP2 with sufficient force for the second hinge member 306 to become detached from the third hinge member 308 at the separable joint 326 and to deform the second hinge member 306 at an intermediate portion 329 for allowing the hood 104 to move to its displaced orientation DO with respect to the body structure 106.

The force exerting device 302 is not unnecessarily limited to being any particular type or configuration of force exerting device. Examples of means for displacing a force delivering member of a force exerting device include, but are not limited to, an explosive charge (i.e., pyrotechnic charge), a compressed spring, an electromagnetic field, a pneumatic charge, a hydraulic charge, and the like. Functionally, the force exerting device 302 needs to be configured for moving the force delivering member 328 from the at-rest position RP2 toward its fully displaced position DP2 with sufficient force to break the separable joint 326 and to displace the hood 104 vertically to bend the second hinge member 306 (i.e., the deforming hinge member). It is disclosed herein that the second hinge member 306 can be configured for it to preferentially bend as opposed to the third hinge member 308 such as by, for example, material thickness (e.g., second hinge member material thinner than the third hinge member material), formed-in stiffening (e.g., third hinge member material including strengthening contours), and/or material strength (e.g., third hinge member material stronger than the second hinge member material).

In a similar manner as discussed above in reference to FIG. 4, the second hinge member 306 has apertures therein for allowing the second hinge member 306 to be secured to the hood 104 by the fasteners 316 extending through each aperture. A configuration of the apertures of the second hinge member 306 allows a shank portion of each fastener 316 to pass therethrough and inhibits a head of each fastener 316 from passing therethrough. In a similar manner as also discussed above in reference to FIG. 4, the third hinge member 308 has an aperture aligned with each aperture of the second hinge member 306 when the second and third hinge members 306, 308 are coupled to each other by the separable joint 326. A configuration of the apertures of the third hinge member 308 allows both the shank and the head of the fasteners 316 to pass therethrough. In this manner, the fasteners 316 do not inhibit or obstruct pivoting movement between the second and third hinge members 306, 308.

Figure 8:
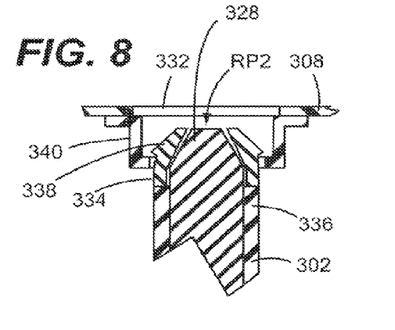
FIG. 8 is a fragmentary side view of a hinge member retaining arrangement of the pedestrian head impact protection apparatus of FIG. 6 with engagement members of the hinge member retaining arrangement in a non-deployed orientation.
Figure 9:
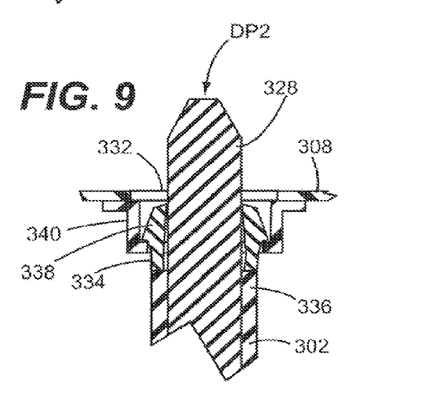
FIG. 9 is a fragmentary side view of the hinge member retaining arrangement of the pedestrian head impact protection apparatus of FIG. 6 with the engagement members of the hinge member retaining arrangement in a deployed orientation.

Optionally, the hinge assembly 300 can be configured for limiting deflection of the third hinge member 308 during decoupling of the separable joint 326 by the force delivering member 328. Depending on the particular configuration of the hinge assembly 300 (e.g., when the hinge assembly 300 is a gooseneck type hinge assembly), such deflection limiting functionality can be beneficial in that it provides for enhanced rigidity of the third hinge member 308 during decoupling of the separable joint 326. As shown in FIGS. 8 and 9, the third hinge member 308 includes an access passage 332 therein and the force delivering member 328 engages the second hinge member 306 through the access passage 332. A hinge member retaining device 334 is mounted on a housing 336 of the force exerting device 302. Movement of the force delivering member 328 from its at-rest position RP2 toward its fully displaced position DP2 causes engagement members 338 of the hinge member retaining device 334 to become engaged with a hinge member retaining structure 340 that is mounted on the third hinge member 308. In this manner, the hinge member retaining device 334 alters from an at-rest configuration to a hinge assembly engaging configuration. Engagement of the engagement members 338 with the hinge member retaining structure 340 results in limited deflection of the third hinge member 308 in a direction corresponding to the force delivering member 328 moving from its at-rest position RP2 toward its fully displaced position DP2 when the hood 106 is in the closed orientation CO and the hinge member retaining device is in the hinge assembly engaging configuration.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A hinge assembly configured for pivotably attaching a hood of a vehicle to a body structure of the vehicle, wherein the hood and the body structure define mounting interfaces through which the hinge assembly is connected between the hood and the body structure, the hinge assembly comprising:
   a first hinge member having a first end portion thereof configured for being attached to the vehicle at a first one of said mounting interfaces;
   a second hinge member having a first end portion thereof configured for being attached to the vehicle at a second one of said mounting interfaces, the second hinge member has an aperture therein for allowing the second hinge member to be secured to the second one of said mounting interfaces by a fastener extending through the aperture, a configuration of said second hinge member aperture allows a shank of the fastener to pass therethrough and inhibits a head of the fastener from passing therethrough; and
   a third hinge member having a first end portion thereof pivotably attached to a second end portion of the first hinge member for allowing pivoting therebetween about a first pivot axis and having a second end portion thereof pivotably attached to a second end portion of the second hinge member for allowing pivoting therebetween about a second pivot axis, the third hinge member has an aperture therein aligned with said second hinge member aperture when said second and third hinge members are coupled to each other by the separable joint, a configuration of said third hinge member aperture allows both the shank and the head of the fastener to pass therethrough, wherein a separable joint is provided between said second and third hinge members for coupling the second hinge member to the third hinge member to inhibit pivotal movement therebetween about the second pivot axis until sufficient force is exerted on at least one of said hinge members for causing the second hinge member to become decoupled from the third hinge member at the separable joint thereby allowing pivoting between the second and third hinge members about the second pivot axis.

2. The hinge assembly of claim 1 wherein:
the first one of said mounting interfaces is located on the hood of the vehicle; and
the second one of said mounting interfaces is located on the body structure of the vehicle.

3. The hinge assembly of claim 1 wherein:
the first one of said mounting interfaces is located on the body structure of the vehicle; and
the second one of said mounting interfaces is located on the hood of the vehicle.

4. The hinge assembly of claim 1 wherein a top surface of the second hinge member extends substantially parallel with a bottom surface of the third hinge member while said second and third hinge members are coupled together by the separable joint provided therebetween.

5. The hinge assembly of claim 4 wherein:
the second hinge member has an aperture therein for allowing the second hinge member to be secured to the second one of said mounting interfaces by a fastener extending through the aperture;
the third hinge member has an aperture therein aligned with said second hinge member aperture when said second and third hinge members are coupled to each other by the separable joint;
a configuration of said second hinge member aperture allows a shank of the fastener to pass therethrough and inhibits a head of the fastener from passing therethrough; and
a configuration of said third hinge member aperture allows both the shank and the head of the fastener to pass therethrough.

6. A vehicle, comprising:
a hinge assembly pivotally attaching a hood of the vehicle to a body structure of the vehicle for allowing the hood to be moved between a closed orientation and an open position, wherein the hood and the body structure define mounting interfaces through which the hinge assembly is connected between the hood and the body structure, wherein the hinge assembly includes a first hinge member having a first end portion thereof attached to a first one of said mounting interfaces;
a second hinge member having a first end portion thereof attached to a second one of said mounting interfaces, the second hinge member has an aperture therein for allowing the second hinge member to be secured to the second one of said mounting interfaces by a fastener extending through the aperture, a configuration of said second hinge member aperture allows a shank of the fastener to pass therethrough and inhibits a head of the fastener from passing therethrough;
a third hinge member having a first end portion thereof pivotably attached to a second end portion of the first hinge member for allowing pivoting therebetween about a first pivot axis and having a second end portion thereof pivotably attached to a second end portion of the second hinge member for allowing pivoting therebetween about a second pivot axis, the third hinge member has an aperture therein aligned with said second hinge member aperture when said second and third hinge members are coupled to each other by the separable joint, a configuration of said third hinge member aperture allows both the shank and the head of the fastener to pass therethrough, wherein a separable joint is provided between said second and third hinge members for coupling the second hinge member to the third hinge member to inhibit pivotal movement therebetween about the second pivot axis until sufficient force is exerted on at least one of said hinge members for causing the second hinge member to become decoupled from the third hinge member at the separable joint thereby allowing pivoting, between the second and third hinge members about the second pivot axis; and
a force exerting device including a force delivering member selectively moveable from an at-rest position toward a fully displaced position, wherein the force exerting device is mounted on the body structure adjacent to the hinge assembly such that the force delivering member comes into contact with one of said second and third hinge members as the force delivering member moves from its at-rest position toward its fully displaced position when the hood is in the closed orientation, wherein the force exerting device causes the force delivering member to move from its at-rest position toward its fully displaced position with sufficient force for the second hinge member to become detached from the third hinge member at the separable joint.

7. The vehicle of claim 6 wherein:
the first one of said mounting interfaces is located on the hood of the vehicle;
the second one of said mounting interfaces is located on the body structure of the vehicle; and
the force delivering member comes into contact with the first end portion of the third hinge member as the force delivering member moves from its at-rest position toward its fully displaced position.

8. The vehicle of claim 7 wherein:
the second hinge member includes an intermediate portion between its said first and second end portions thereof;
the intermediate portion is configured for allowing the second end portion of the second hinge member to bend with respect to the first end portion of the second hinge member when the force delivering member is moved from its at-rest position toward its fully displaced position with sufficient force for the second hinge member to become detached from the third hinge member at the separable joint.

9. The vehicle of claim 8 wherein:
the second hinge member has an aperture therein for allowing the second hinge member to be secured to the second one of said mounting interfaces by a fastener extending through the aperture;
the third hinge member has an aperture therein aligned with said second hinge member aperture when said second and third hinge members are coupled to each other by the separable joint;
a configuration of said second hinge member aperture allows a shank of the fastener to pass therethrough and inhibits a head of the fastener from passing therethrough; and a configuration of said third hinge member aperture allows both the shank and the head of the fastener to pass therethrough.

10. The vehicle of claim 6 wherein:
the first one of said mounting interfaces is located on the body structure of the vehicle;
the second one of said mounting interfaces is located on the hood of the vehicle; and
the force delivering member comes into contact with the second hinge member as the force delivering member moves from its at-rest position toward its fully displaced position.

11. The vehicle of claim 10 wherein:
the third hinge member includes an access passage therein; and
the force delivering member engages the second hinge member through the access passage.

12. The vehicle of claim 10 wherein:
the force delivering member is slideably mounted within a housing of the force exerting device;
the housing is fixedly attached to the body structure of the vehicle;
a hinge member retaining device is mounted on the housing of the force exerting device;
movement of the force delivering member from its at-rest position toward its fully displaced position causes the hinge member retaining device to alter from an at-rest configuration to a hinge assembly engaging configuration;
the hinge member retaining device limits deflection of the third hinge member in a direction corresponding to the force delivering member moving from its at-rest position toward its fully displaced position when the hood is in the closed position and the hinge member retaining device is in the hinge member retaining configuration.

13. A method for providing pedestrian head impact protection at a hood of a vehicle using a hood hinge assembly having a deforming hinge member pivotally attached to a mating hinge member allowing pivoting therebetween about a pivot axis and a separable joint provided between the deforming hinge member and the mating hinge member for coupling the deforming hinge member to the mating hinge member to inhibit pivotal movement therebetween about the pivot axis until sufficient force is exerted on at least one of said hinge members for causing the deforming hinge member to become decoupled from the mating hinge member at the separable joint allowing pivoting between said deforming and mating hinge members about the pivot axis, the method comprising:
sensing an impact at a frontal portion of a vehicle;
causing the deforming hinge member of the hood hinge assembly to become deformed in response to sensing the impact such that a relative position of the hood with respect to a body structure of the vehicle is altered in a manner whereby a distance between an underside of the hood and a topmost surface of an under-hood component of the vehicle is increased by said altered relative position of the hood with respect to the body structure, wherein causing the deforming hinge member to become deformed includes energizing, a force exerting device mounted on the body structure such that a force delivering member of the force exerting device moves from an at-rest position thereof toward a fully displaced position thereof thereby forcibly engaging the hinge assembly as the force delivering member moves from the at-rest position thereof toward the fully displaced position thereof, the force delivering member exerting sufficient force on at least one of said hinge members for the deforming hinge member to become detached from the mating hinge member at the separable joint.

14. The method of claim 13 wherein the force delivering member forcibly engages only the deforming hinge member.

15. The method of claim 14 wherein:
the deforming hinge member is attached directly to the hood at a first end portion thereof and is pivotably attached to the mating hinge member at a second end portion thereof for allowing relative movement therebetween about the pivot axis;
causing, the deforming hinge member of the hood hinge assembly to become deformed includes causing a hinge member retaining device of the force exerting device to engage the mating hinge member in conjunction with the force delivering member moving from its at-rest position toward its fully displaced position when the hood is in a closed position with respect to the body structure of the vehicle; and
engagement of the hinge member retaining device with the mating hinge member limits deflection of the mating hinge member in a direction corresponding to the force delivering member moving from its at-rest position toward its fully displaced position.

16. The method of claim 13 wherein the force delivering member forcibly engages only the mating hinge member.

17. The method of claim 16 wherein:
the deforming hinge member is pivotably attached to the mating hinge member allowing pivoting therebetween about a pivot axis;
a separable joint is provided between the deforming hinge member and the mating hinge member for coupling the deforming hinge member to the mating hinge member to inhibit pivotal movement therebetween about the pivot axis until sufficient force is exerted on the mating hinge member by the force delivering member for causing the deforming hinge member to become decoupled from the mating hinge member at the separable joint thereby allowing pivoting between said deforming and mating hinge members about the pivot axis; and
causing the deforming hinge member of the hood hinge assembly to become deformed includes the force delivering member exerting sufficient force on the mating hinge member for the deforming hinge member to become detached from the mating hinge member at the separable joint.

* * * * *